United States Patent
Miyanaga

(10) Patent No.: US 8,613,577 B2
(45) Date of Patent: Dec. 24, 2013

(54) CORE DRILL

(75) Inventor: Masaaki Miyanaga, Hyogo (JP)

(73) Assignee: Kabushiki Kaisha Miyanaga, Hyogo (JP)

( * ) Notice: Subject to any disclaimer, the term of this patent is extended or adjusted under 35 U.S.C. 154(b) by 395 days.

(21) Appl. No.: 13/121,777

(22) PCT Filed: Sep. 30, 2009

(86) PCT No.: PCT/JP2009/005039
§ 371 (c)(1),
(2), (4) Date: Mar. 30, 2011

(87) PCT Pub. No.: WO2010/044206
PCT Pub. Date: Apr. 22, 2010

(65) Prior Publication Data
US 2011/0182683 A1    Jul. 28, 2011

(30) Foreign Application Priority Data
Oct. 15, 2008 (JP) .................. 2008-266761

(51) Int. Cl.
*B23B 51/05* (2006.01)
(52) U.S. Cl.
USPC .......................... 408/204; 408/206
(58) Field of Classification Search
USPC ................................. 408/204, 206
IPC ....................................... B23B 51/05
See application file for complete search history.

(56) References Cited

U.S. PATENT DOCUMENTS

| 4,408,935 A * | 10/1983 | Miyanaga ............. 408/206 |
| 5,988,956 A * | 11/1999 | Omi et al. ............ 408/204 |
| 2007/0065244 A1 * | 3/2007 | Miyanaga ............. 408/204 |

FOREIGN PATENT DOCUMENTS

| DE | 3012875 A | * 10/1981 | ............. B23B 51/04 |
| GB | 2080711 A | * 2/1982 | ............. B23B 51/04 |
| JP | 05-154709 | 6/1993 | |
| JP | 10-100009 | 4/1998 | |
| JP | 2001-138120 | 5/2001 | |
| JP | 2007-276027 | 10/2007 | |
| WO | 2004108333 A1 | 12/2004 | |

* cited by examiner

*Primary Examiner* — Daniel Howell
*Assistant Examiner* — Michael Vitale
(74) *Attorney, Agent, or Firm* — The Ollila Law Group LLC

(57) ABSTRACT

An outer peripheral surface of a tip end portion of the core body has a tapered surface which is thinner toward the tip end and is edged at the tip end. Recesses 2B are formed at an opening peripheral edge of the tip end portion to attach cutting chips 3. A portion of the core body 2 which is adjacent to a forward portion of each of the recesses in the rotational direction is bent radially inward. Each of the cutting chips 3 has a stepped portion such that a radially inner portion 3a of a forward end portion protrudes forward and a radially outer portion of the forward end portion recedes rearward. A radially inner portion of a rearward end portion of the stepped portion is located forward and a radially outer portion of the rearward end portion is located rearward.

5 Claims, 6 Drawing Sheets

CORE DRILL

TECHNICAL FIELD

The present invention relates to a core drill used to drill a hole with a relatively large diameter in materials in which a hole is to be drilled, such as wood, resin, metal or a composite material of these. Particularly, the present invention relates to a core drill which is suitable for use as a cordless type portable electric drill.

BACKGROUND ART

Conventionally, a core drill is used to drill a hole with a relatively large diameter in materials in which the hole is to be drilled. The core drill includes a cylindrical core body, a shank member which is provided above the cylindrical core body and attached to a chuck disposed at a drive shaft, and cutting chips provided at the peripheral portion of the tip end portion of the core body such that the cutting chips are arranged to be spaced apart from each other. In addition, gullets are formed at portions of the core body, in locations forward relative to the cutting chips in a rotational direction of the core drill, to discharge cutting waste toward a base end of the core drill. At a portion of the core body which is located at a base end side of each gullet, a discharge groove having a spiral shape (tilting shape) is provided to feed the cutting waste toward the base end. In addition to the above constituents, in some core drills, a center drill having a tip end protruding farther than the tip end of the core body is provided at the center of the core body to easily determine a drilling position.

The core drill having the above structure is configured to drill an annular groove which is the same as a rotational trajectory of the cutting chips, deeper, in a material in which a hole is to be drilled, such as wood, resin, metal or a composite material of these, for example, an upper plate of a kitchen unit, thus efficiently drilling a hole with a large diameter substantially equal to the outer diameter of the core drill (see patent literature 1).

After drilling the hole as described above, cylindrical waste is left inside the core body of the core drill.

CITATION LIST

Patent Literature

Japanese Laid-Open Patent Application Publication No. Hei. 10-100009

SUMMARY OF THE INVENTION

Technical Problem

In recent years, a cordless type (rechargeable battery mounted) portable electric drill has been used frequently, because it is not necessary to extend an electric power supply code from an electric outlet. Especially, operators frequently use the cordless type portable electric drill to drill holes in construction site, etc, without an electric power supply code.

However, the cordless type electric drill has drawbacks that its rotational torque is lower than the rotational torque of a "code type electric drill" which is supplied with electricity from an electric outlet via an electric power supply code, and a drilling time is limited because of a battery capacity.

The present invention has been made under the circumstances, and an object of the present invention is to provide a core drill which is capable of sufficiently performing a drilling operation and consumes a small amount of electricity in a battery when a cordless type electric drill with a low rotational torque is used to drill a hole.

Solution to Problems

A core drill suitable for a cordless type portable electric drill which comprises cutting chips attached to an opening peripheral edge of a tip end portion of a cylindrical core body such that the cutting chips are apart from one another and protrude radially from inner and outer peripheral surfaces of the core body and is configured to drill an annular groove in a material to form a hole therein, wherein the core body is set to have a small wall thickness capable of withstanding a cutting rotational torque, and an outer peripheral surface of the tip end portion of the core body is configured to have a tapered surface such that the outer peripheral surfaces is closer to the inner peripheral surface in a direction toward a tip end; recesses into which the cutting chips are fitted are provided at the opening peripheral edge of the tip end portion of the core body such that the recesses open toward the tip end and extend toward a base end and a portion of the core body which is adjacent to a forward portion of each of the recesses in a rotational direction is bent radially inward; each of the cutting chips is configured to have a stepped portion when viewed from a bottom such that a radially inner portion of a forward end portion of each cutting chip in the rotational direction protrudes forward in the rotational direction and a radially outer portion of the forward end portion recedes rearward in the rotational direction; each of the cutting chips is configured to have a stepped portion when viewed from a bottom such that a radially inner portion of a rearward end portion of the cutting chip in the rotational direction is located forward in the rotational direction and a radially outer portion of the rearward end portion recedes rearward in the rotational direction; and each of the cutting chips is attached to the core body in such a manner that a forward end portion of each of the recesses is in contact with the radially inner portion of the forward end portion of the cutting chip in the rotational direction, and a connecting surface connecting the radially outer portion of the rearward end portion of the cutting chip in the rotational direction to the radially inner portion of the rearward end portion of the cutting chip in the rotational direction is in contact with a portion of the outer peripheral surface of the core body which is adjacent to a rearward portion of the recess in the rotational direction.

In accordance with the core drill of the present invention having the above configuration, since the area of a rotational trajectory of a cutting region of the core drill is lessened, a required rotational torque is lessened. In addition, since a drilling volume (cutting volume) which is a product of the rotational trajectory of the cutting region and a drilling depth is lessened, electric power consumption is lessened. Because of absence of gullets in locations forward relative to the cutting chips in the rotational direction, the tip end of the core drill has a complete continuous ring shape, including the cutting chips, when viewed from the bottom, as described above, and therefore, the wall thickness of the core body can be reduced while providing stiffness required for drilling. Since the connecting portion connecting the core body to the cutting chips is configured as described above at the tip end portion of the core body, most of the cutting waste generated by cutting with the cutting chips can be discharged smoothly efficiently toward the outer peripheral surface of the core body, although there are no gullets as described above. Since each of the cutting chips is radially divided into two parts which are the radially inner portion and the radially outer portion at the forward end portion in the rotational direction to form the stepped portion, the cutting waste is also divided in the width direction and therefore can be made small. In particular, the width of the metal cutting waste with high stiffness can be reduced. As a result, the cutting waste can be discharged smoothly through a clearance formed between the outer peripheral surface of the core drill and the inner peripheral surface of the drilling hole, even if the area of the rotational trajectory is small as described above.

Further, since each of the cutting chips is welded to the core body by brazing or the like at the connecting surface connecting the radially inner portion to the radially outer portion in the rearward end portion of the cutting chip in the rotational direction, as described above, the cutting chips can be firmly attached to the core body although the core body is formed to have a small wall thickness and the outer peripheral surface of the tip end portion of the core body has a tapered surface such that the outer peripheral surface is closer to the inner peripheral surface in a direction toward the tip end.

In the core drill, the tip end portion of the core body may have an edged shape such that the tapered surface of the outer peripheral surface is in close proximity to the inner peripheral surface to form a line shape with a small width at the tip end. This makes it possible to discharge the cutting waste toward the base end efficiently.

In the core drill, each of the cutting chips may have a stepped shape in which the radially inner portion protrudes forward in the rotational direction relative to the radially outer portion when viewed from the bottom by the stepped portion of the forward end portion and the stepped portion of the rearward end portion of the cutting chip, and each of the cutting chips is attached to the core body such that the radially inner portion is fitted into the recess. Since the cutting chips are attached to the core body by a physical engagement structure as well as brazing or the like, the cutting chips can be firmly attached to the core body.

The connecting surface of the cutting chip may gradually protrude in a radially inward direction toward the tip end along the tapered surface of the core body. This preferably increase the attaching areas of the cutting chips to the core body and preferably disperses the direction in which a stress is exerted on these attaching surfaces.

A forward end surface of the radially inner portion of the forward end portion of the cutting chip in the rotational direction and a forward end surface of the radially outer portion of the forward end portion of the cutting chip in the rotational direction may be tilted in a radial direction such that their outer sides are located rearward in the rotational direction relative to their inner sides. This makes it possible to efficiently discharge the cutting waste toward the outer peripheral surface of the core body.

As the cutting chips, cemented carbide chips are preferably used.

Advantageous Effects of the Invention

In accordance with the core drill configured as described above, since the area of the rotational trajectory of the cutting region of the core drill is small, cutting resistance can be reduced during drilling a hole. Therefore, even a cordless type electric drill with a low rotational torque is capable of easily drilling a hole with a large diameter.

In addition, since the whole cutting volume can be reduced when drilling a hole, the whole processing amount (cutting amount) in drilling a hole is lessened, and an electric power required to drill a hole can be reduced. As a result, a cordless type electric drill with the same battery capacity is capable of drilling more holes.

DESCRIPTION OF THE EMBODIMENTS

Example

Hereinafter, an example of the present invention will be described with reference to the drawings.

Figure 1:
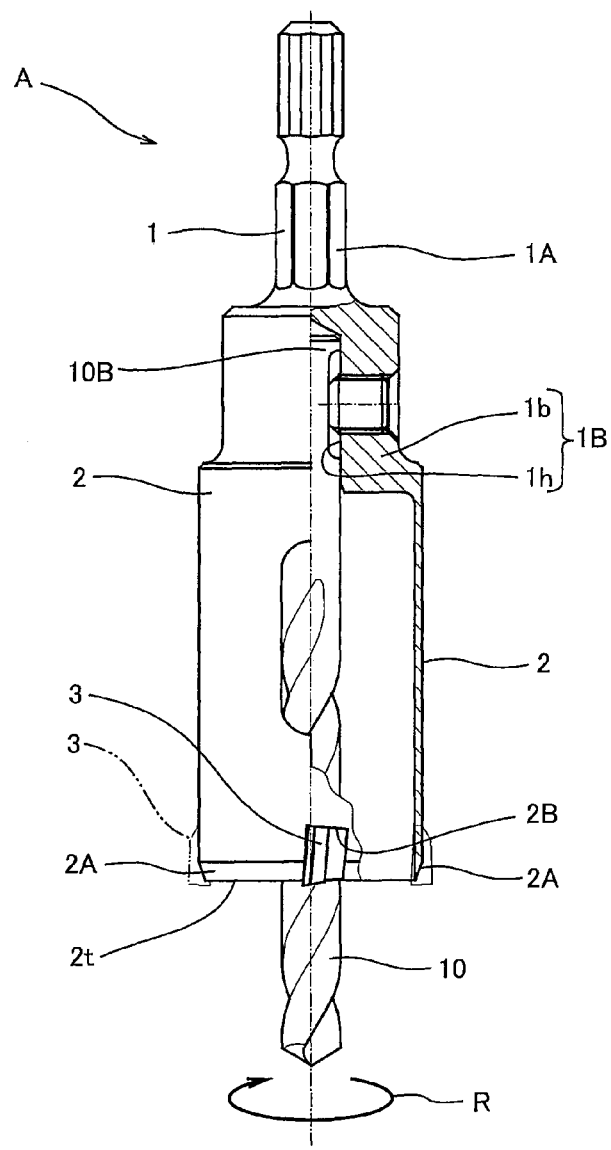
FIG. 1 is a side view showing an entire structure of a core drill according to an embodiment of the present invention.
Figure 2:
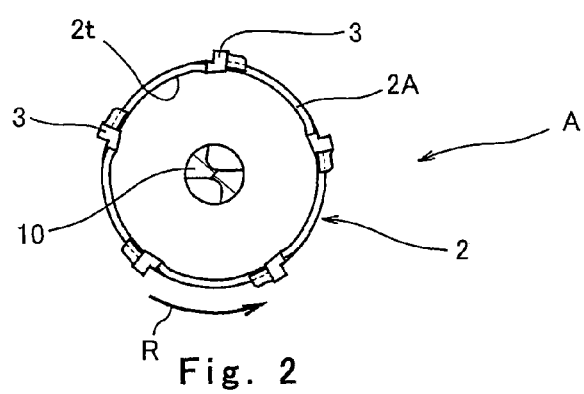
FIG. 2 is a bottom view of the core drill of FIG. 1.
Figure 5:
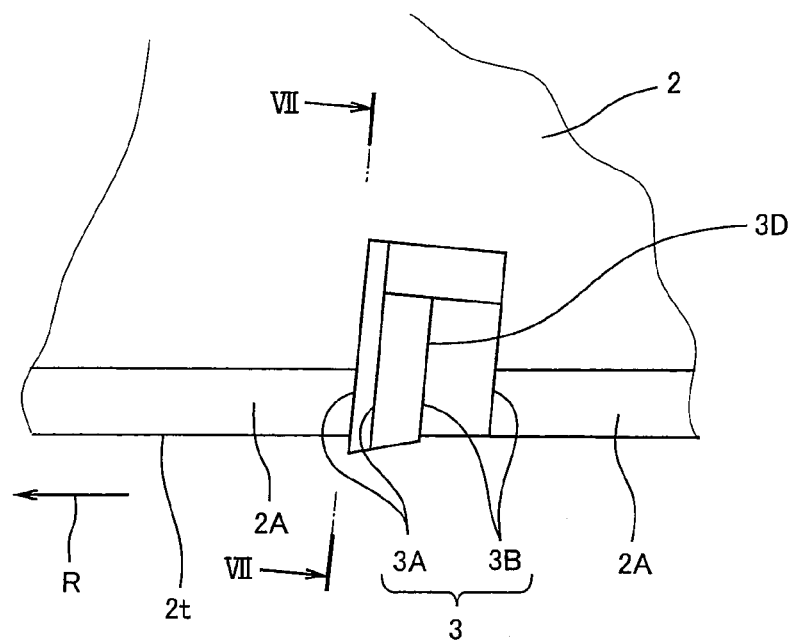
FIG. 5 is a partially enlarged side view showing a state where the cutting chip is disposed into the recess at the tip end portion of the core drill of FIG. 1.
Figure 6:
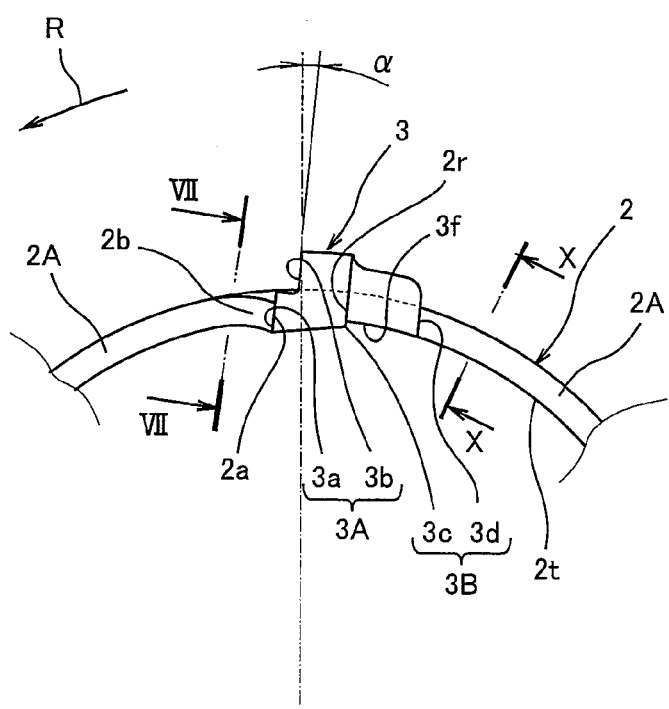
FIG. 6 is a view showing a state where the cutting chip of FIG. 5 is disposed, when viewed from the bottom.

FIG. 1 is a side view showing an entire core drill according to an example of the present invention. FIG. 2 is a bottom view of the core drill of FIG. 1. FIG. 5 is a partially enlarged side view showing a state where the cutting chip is disposed at the tip end portion of the core drill of FIG. 1. FIG. 6 is a view showing a state where the cutting chip of FIG. 5 is disposed, when viewed from the bottom.

Referring to FIG. 1, A designates a core drill. The core drill A includes a shank member 1 at its base end portion, which is attached to an electric drill, and a cylindrical core body 2 at a tip end side of the shank member 1.

In this embodiment, the shank member 1 includes a shank shaft 1A having a hexagonal cylinder shape to be engageable into a drill attaching hole of a so-called cordless type electric drill and a base portion 1B provided at the tip end side of the shank shaft 1A. The base portion 1B has an attaching hole 1h to which a base end portion 10B of the center drill 10 positioned prior to drilling a hole is threadingly attached, and a core body attaching portion 1b to which the base end of the core body 2 is attached.

Figure 3:
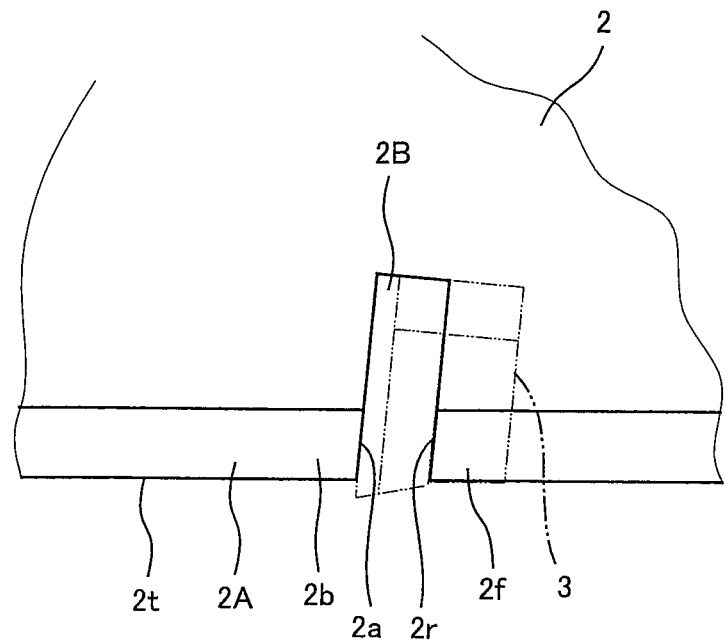
FIG. 3 is a partially enlarged side view showing a recess into which a cutting chip is fitted, which is formed at the tip end portion of the core drill of FIG. 1, and a region in the vicinity of the recess.
Figure 4:
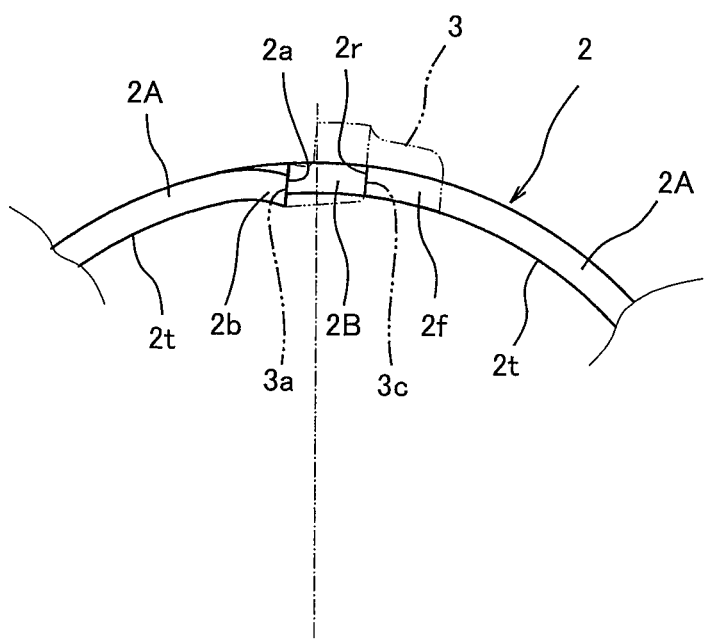
FIG. 4 is a view showing the recess and the region in the vicinity of the recess of FIG. 3, when viewed from a bottom.
Figure 7:
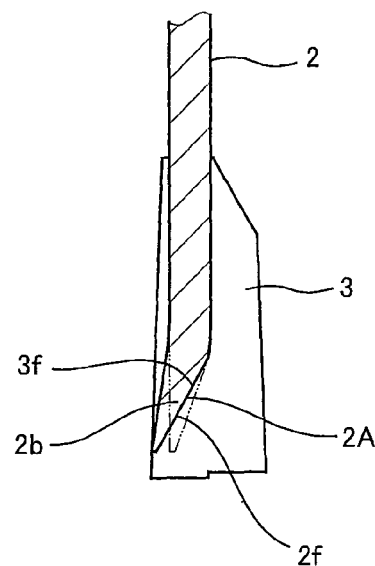
FIG. 7 is a enlarged view taken in the direction of arrows along VII-VII of FIG. 6, showing a bent state of the lower end of the core body.

A tip end 2t of the core body 2 opens toward a tip end. An outer peripheral surface 2A of the tip end portion of the core body 2 is gradually thinned in a direction toward the tip end and has a tapered surface having an edged shape at the tip end. As shown in FIGS. 3 and 4, a plurality of cutting chip fitted recesses 2B which open at the tip end and extend toward the base end are provided to be spaced apart from each other in a circumferential direction (rotational direction). The recesses 2B of a suitable number may be provided in view of a drilling ability and durability. In this example, five recesses 2B are arranged in the rotational direction (circumferential direction). However, in a case where the core drill A has a larger diameter, the recesses 5B of a larger number, for example five or more may be provided, as a matter of course. As shown in enlarged view of FIG. 4 or 7, a wall of the core body 2, which is a portion 2b adjacent to a forward portion of the recess 2B in the rotational direction is bent (curved) radially inward.

Figure 10:
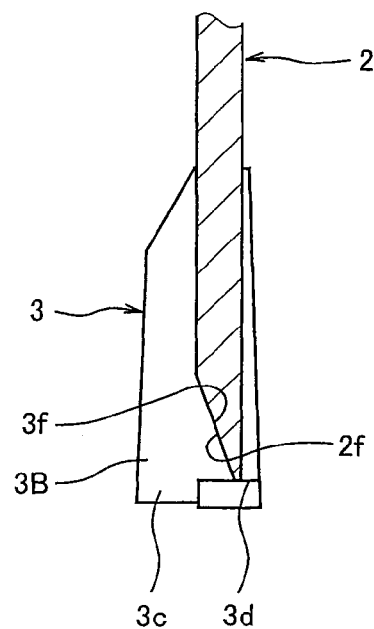
FIG. 10 is an enlarged view taken in the direction of arrows along X-X of FIG. 6, showing a configuration of a connecting surface formed between a portion of the outer peripheral surface of the core body which is adjacent to a rearward portion of the recess and the inner peripheral surface of a rear-half portion of the cutting chip.

As shown in FIG. 1, 2, 5 or 6, each cutting chip 3 is attached to the recess 2B. In this example, the cutting chip 3 formed of cemented carbide is used, but the cutting chip 3 is not limited to this. The cutting chip 3 may be formed of other material, for example, tool steels. As shown in FIG. 6, each cutting chip 3 is configured to have a stepped portion when viewed from a bottom such that a radially inner portion 3a of a forward end portion 3A in a rotational direction R (counterclockwise direction in FIG. 6) protrudes forward in the rotational direction relative to a radially outer portion 3b of the forward end portion 3A in the rotational direction R, in other words, the radially outer portion 3b recedes rearward in the rotational direction relative to the radially inner portion 3a. The cutting chip 3 is also configured to have a stepped portion when viewed from the bottom such that a radially inner portion 3c of a rearward end portion 3B in the rotational direction R is located forward in the rotational direction, in other words, a radially outer portion 3d of the rearward end portion 3B in the rotational direction R is located rearward in the rotational direction relative to the radially inner portion 3c. As a whole, as shown in FIG. 2 or 6, because of the stepped portion of the forward end portion 3A and the stepped portion of the rearward end portion 3B of the cutting chip 3, the cutting portion 3 has a stepped shape in which the radially inner portions 3a and 3c protrude forward in the rotational direction R, relative to the radially outer portions 3b and 3d, respectively, when viewed from the bottom. As shown in FIG. 10, the tip end portion of a connecting surface 3f connecting the radially inner portion 3c of the rearward end portion 3B to the radially outer portion 3d of the rearward end portion 3B in the cutting chip 3 protrudes gradually radially inward in a direction toward the tip end along an outer peripheral surface 2f (part of the outer peripheral surface 2A) forming the tapered surface of the core body 2 shown in FIG. 4.

As shown in FIG. 5 or 6, the cutting portion 3 is attached to the recess 2B of the core body 2 in such a manner that the radially inner portion 3a of the forward end portion 3A of the cutting chip 3 in the rotational direction R is in contact with the forward end portion 2a (see FIGS. 3, 4 and 6) of the recess 2B in the rotational direction and the radially inner portion 3c of the rearward end portion 3B of the cutting chip 3 in the rotational direction R is in contact with the rearward end portion 2r (see FIGS. 3, 4 and 6) of the recess 2B in the rotational direction, i.e., the radially inner portion of the cutting chip 3 is fitted into the recess 2B (see a solid line and two-dotted line of FIG. 4). In this attached state, the cutting chip 3 is fitted to the core body 2 in such a manner that the connecting surface 3f (see FIG. 6) connecting the radially outer portion 3d of the rearward end portion 3B of the cutting chip 3 to the radially inner portion 3c of the rearward end portion 3B of the cutting chip 3 in the rotational direction R is in contact with the outer peripheral surface 2f (see FIGS. 3 and 4) adjacent to a rearward portion of the cutting chip fitted recess 2B in the rotational direction. As shown in FIG. 6, with the cutting chip 3 fitted to the core body 2, the forward end surface of the radially inner portion 3a of the forward end portion 3A in the rotational direction and the forward end surface of the radially outer portion 3b of the forward end portion 3A in the rotational direction are tilted at a tilting angle α such that their outer sides are located rearward in the rotational direction relative to their inner sides. The inclination angle α of the radially inner portion 3a is not depicted in FIG. 6.

Figure 9:
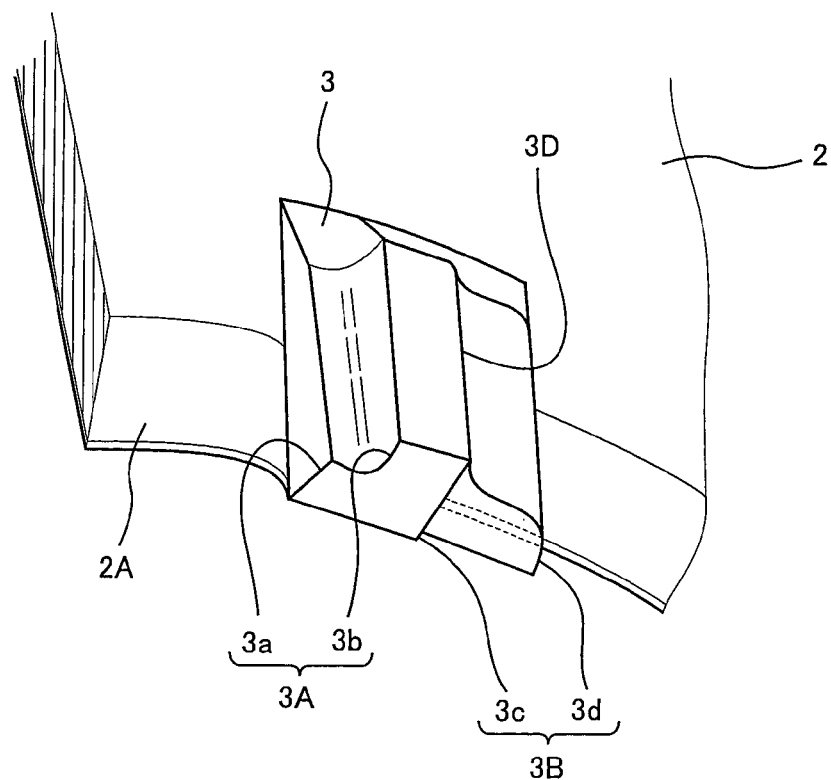
FIG. 9 is a perspective view of the tip end portion of the core body into which the cutting chip is fitted, when viewed obliquely from a tip end.

As shown in FIG. 5, FIG. 6, FIG. 9 or the like, the cutting chip 3 is firmly welded to the recess 2B by brazing in a state where the cutting chip 3 is attached (fitted) to the recess 2B. The welding is not limited to brazing. The cutting chip 3 may be welded to the recess 2B by other welding method such as laser welding, or may be attached thereto by an attaching method (e.g., bonding agent, etc) other than the welding. As shown in FIG. 1 or 6, in this example, the outer peripheral surface of the cutting chip 3 has a stepped portion D axially extending, at a boundary between a front-half portion and a rear-half portion such that the rear-half portion recedes radially inward relative to the front-half portion. However, the outer peripheral surface of the cutting chip 3 is not limited to this structure, but may be formed by a flat curved surface without the stepped portion D at the boundary.

Figure 8:
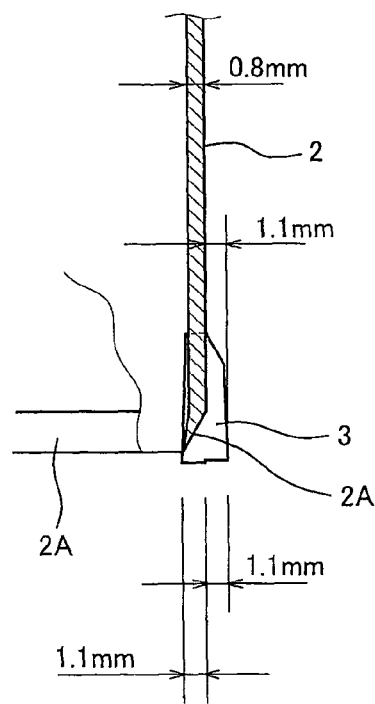
FIG. 8 is a view taken in the direction of arrows along VII-VII of FIG. 6, showing a configuration of the lower end of the core body.

The wall thickness of the core body 2 is reduced to a degree with which the core body 2 is capable of withstanding a cutting rotational torque. As shown in FIG. 8, in this example, the wall thickness is 0.8 mm in the case of the core drill of an outer diameter 30 mm. In most cases, the ratio of the wall thickness to the outer diameter (ratio of wall thickness to outer diameter) is about 0.0267. The wall thickness is 0.8 mm~0.9 mm in the case of the core drill of an outer diameter 50 mm. The wall thickness is 0.9 mm~1.1 mm in the case of the core drill of an outer diameter 100 mm. The thickness (or ratio of wall thickness to outer diameter) is about 15 to 30% smaller than that of the conventional structure. In this example, a radial dimension (wall thickness) of the cutting chip 3 is 2.2 mm. The numeric values "0.8 mm", "1.1 mm", and others in FIG. 8 are numeric values expressing actual dimension of the core drill A in this example by millimeters. The core body 2 is formed of steel having high strength and stiffness.

The core drill A of this example configured as described above has features and advantages as follows when the core drill A drills a hole in materials in which a hole is to be drilled, such as wood, resin, metal or a composite material of these.

Since the wall thickness of the core body 2 is much smaller than that of the conventional core drill as described above, an area of a rotational trajectory of a cutting region is lessened when the core drill drills a hole, and therefore a rotational cutting torque is significantly reduced. This enables the cordless type electric drill, especially, a cordless type electric drill with a low output to easily drill a desired hole. In addition, since the whole drilling volume (cutting volume) is significantly reduced, more holes can be drilled with a cordless type electric drill with an equal battery capacity.

Although the core body 2 is formed to have a small wall thickness as described above, the opening of the tip end 2t of the core drill A has a complete ring shape without a cut portion, by attaching (welding) the cutting chips 3 to the recesses 2B as shown in FIG. 2, stiffness in the rotational direction can be increased, and the core body 2 is not deformed and can maintain its cylindrical shape with respect to the rotational cutting torque during the cutting.

The gullets typically provided in locations forward relative to the cutting chips 3 in the rotational direction are omitted to form the complete ring shape.

a) As described above, the outer peripheral surface 2A at the tip end portion of the core body 2 is gradually thinned in a direction toward the tip end to form the tapered surface of the substantially edged shape at the tip end 2t.

b) As described above with reference to FIG. 6, the wall of the core body 2 which is the portion 2b adjacent to the forward portion of the cutting chip fitted recess 2B in the rotational direction is bent radially inward and the bent end (rearward end in the rotational direction R) is in contact with the inner end of the tip end of the cutting chip 3.

c) As shown in FIG. 6, the forward end surface of the radially inner portion 3a and the forward end surface of the radially outer portion 3b of the forward end portion 3A of the cutting chip 3 in the rotational direction are tilted at the tilting angle α with respect to a radial direction such that their outer sides are positioned rearward in the rotational direction relative to their inner sides.

Therefore, the cutting waste generated by cutting can be discharged smoothly toward the base end along the outer peripheral surface 2A forming the tapered surface.

Furthermore, as described above, the tip end 3A of the cutting chip 3 is divided into the radially outer portion 3d and the radially inner portion 3a to form the stepped portion in the radial direction (width direction), the cutting waste generated by cutting metal or the like is reduced in width. As a result, the cutting waste can be discharged smoothly through a gap between the core body 2 and the inner peripheral surface of the hole drilled, without forming a discharge groove and the like on the outer peripheral surface of the core body 2.

Moreover, since the cutting chips 3 are attached to the core body 2 by brazing, or the like such that the cutting chips 3 are in contact with the core body 2 with a larger area as described above, the cutting chips 3 will not be separated from the core body 2 regardless of the small thickness of the core body 2.

The present invention is not limited to the core drill described in the example, but can be practiced in various forms without departing a technical idea of the present invention.

INDUSTRIAL APPLICABILITY

A core drill of the present invention can be used as a cutting tool of an electric drill such as a cordless type electric drill having a low output.

REFERENCE SIGNS LIST

A . . . core drill
2 . . . core body
2B . . . recess
2f . . . outer peripheral surface adjacent to rearward portion of recess in rotational direction
3 . . . cutting chip
3A . . . forward end portion of cutting chip in rotational direction
3B . . . rearward end portion of cutting chip in rotational direction
3a . . . radially inner portion of forward end portion in rotational direction
3b . . . radially outer portion of forward end portion in rotational direction
3c . . . radially inner portion of rearward end portion in rotational direction
3d . . . radially outer portion of rearward end portion in rotational direction
3f . . . connecting surface of cutting chip

The invention claimed is:

1. A core drill suitable for a cordless type portable electric drill which comprises cutting chips attached to an opening peripheral edge of a tip end portion of a cylindrical core body such that the cutting chips are apart from one another and protrude radially from inner and outer peripheral surfaces of the core body and is configured to drill an annular groove in a material to form a hole therein,
   wherein the core body is set to have a small wall thickness capable of withstanding a cutting rotational torque, and an outer peripheral surface of the tip end portion of the core body is configured to have a tapered surface such that the outer peripheral surface is closer to the inner peripheral surface in a direction toward a tip end;
   recesses into which the cutting chips are fitted are provided at the opening peripheral edge of the tip end portion of the core body such that the recesses open toward the tip end and extend toward a base end and adjacent to a forward portion of each of the recesses in a rotational direction is a wall portion that is bent radially inward;
   each of the cutting chips is configured to have a stepped portion when viewed from a bottom such that a radially inner portion of a forward end portion of each cutting chip in the rotational direction protrudes forward in the rotational direction and a radially outer portion of the forward end portion recedes rearward in the rotational direction;
   each of the cutting chips is configured to have a stepped portion when viewed from a bottom such that a radially inner portion of a rearward end portion of the cutting chip in the rotational direction is located forward in the rotational direction and a radially outer portion of the rearward end portion recedes rearward in the rotational direction; and
   each of the cutting chips is attached to the core body in such a manner that a forward end portion of each of the recesses is in contact with the radially inner portion of the forward end portion of the cutting chip in the rotational direction, and a connecting surface connecting the radially outer portion of the rearward end portion of the cutting chip in the rotational direction to the radially inner portion of the rearward end portion of the cutting chip in the rotational direction is in contact with a portion of the outer peripheral surface of the core body which is adjacent to a rearward portion of the recess in the rotational direction.

2. The core drill according to claim 1, wherein the tip end portion of the core body has an edged shape such that the tapered surface of the outer peripheral surface is in close proximity to the inner peripheral surface to form a line shape with a small width at the tip end.

3. The core drill according to claim 1 or 2, wherein each of the cutting chips has a stepped shape in which the radially inner portion protrudes forward in the rotational direction relative to the radially outer portion when viewed from the bottom by the stepped portion of the forward end portion and the stepped portion of the rearward end portion of the cutting chip, and each of the cutting chips is attached to the core body such that the radially inner portion is fitted into the recess.

4. The core drill according to claim 1 or 2, wherein the connecting surface of the cutting chip gradually protrudes in a radially inward direction toward the tip end along the tapered surface of the core body.

5. The core drill according to claim 1 or 2, wherein a forward end surface of the radially inner portion of the forward end portion of the cutting chip in the rotational direction and a forward end surface of the radially outer portion of the forward end portion of the cutting chip in the rotational direction are tilted in a radial direction such that their outer sides are located rearward in the rotational direction relative to their inner sides.

* * * * *